United States Patent
Nelson

(10) Patent No.: US 7,394,389 B2
(45) Date of Patent: Jul. 1, 2008

(54) WALL MOUNTED PEST SUPPRESSION SYSTEM

(75) Inventor: Thomas D. Nelson, Maplewood, MN (US)

(73) Assignee: Ecolab Inc., St. Paul, MN (US)

( * ) Notice: Subject to any disclaimer, the term of this patent is extended or adjusted under 35 U.S.C. 154(b) by 192 days.

(21) Appl. No.: 11/292,481

(22) Filed: Dec. 2, 2005

(65) Prior Publication Data
US 2007/0126590 A1 Jun. 7, 2007

(51) Int. Cl.
G08B 23/00 (2006.01)
(52) U.S. Cl. .................. 340/573.2; 43/124; 43/131; 340/573.1
(58) Field of Classification Search ............... 340/573.2
See application file for complete search history.

(56) References Cited

U.S. PATENT DOCUMENTS

| | | | | |
|---|---|---|---|---|
| 4,823,505 | A * | 4/1989 | Jackson | 43/124 |
| 4,945,673 | A * | 8/1990 | Lavelle | 43/124 |
| 5,040,326 | A * | 8/1991 | Van Dijnsen et al. | 43/58 |
| 5,241,779 | A * | 9/1993 | Lee | 43/139 |
| 5,915,949 | A * | 6/1999 | Johnson | 43/124 |
| 6,088,950 | A * | 7/2000 | Jones | 43/124 |
| 6,255,652 | B1 * | 7/2001 | Moyer | 250/343 |
| 6,370,812 | B1 * | 4/2002 | Burns et al. | 43/124 |
| 6,594,947 | B2 * | 7/2003 | Lingren et al. | 43/114 |
| 6,937,156 | B2 * | 8/2005 | Gardner et al. | 340/573.2 |
| 7,051,473 | B2 * | 5/2006 | Hoppe et al. | 43/131 |
| 7,165,353 | B2 * | 1/2007 | Matts et al. | 43/131 |
| 2001/0029694 | A1 | 10/2001 | Bodden | 43/102 |
| 2002/0144453 | A1 * | 10/2002 | Su | 43/124 |
| 2005/0091911 | A1 | 5/2005 | Matts et al. | |

* cited by examiner

Primary Examiner—Davetta W. Goins
Assistant Examiner—Kerri L McNally
(74) Attorney, Agent, or Firm—Andrew D. Sorensen; Anneliese S. Mayer

(57) ABSTRACT

A wall-mountable system of the present invention detects and suppresses pests. The system includes a housing, a pest detection device, and a line. The housing is mounted to a wall and penetrates into a remote area behind the wall. The housing also has an access hole. The pest detection device is positioned behind the wall. The line is connected to the housing at a first end and is connected to the pest detection device at a second end.

19 Claims, 2 Drawing Sheets

WALL MOUNTED PEST SUPPRESSION SYSTEM

FIELD OF THE INVENTION

The present invention relates to a system and method for detecting and suppressing pests. In particular, the present invention relates to a system and method for detecting and suppressing pests located in remote, difficult to access areas.

BACKGROUND OF THE INVENTION

Due to their size, small pests such as insects and rodents are able to easily inhabit remote areas within structures having limited access, such as wall or ceiling voids, without being detected. This is particularly true of structures built with metal supports. The metal supports typically contain a number of holes to provide a convenient means of passing wires and the like behind a wall. Even most structures built using wooden supports have holes drilled through the wooden supports for the same purpose. The holes within the supports make it easy for small pests to travel behind the structure without being detected. Because it is difficult for people to access these remote areas, detecting and suppressing pests located behind these structures has proven to be a challenge using current pest detection methods.

One common method currently used to detect pests is to place bait directly at the location(s) of suspected pest infestation. While this method can be effectively used in remote areas by dropping the bait behind the structures, verification of the pests either taking or consuming the bait is difficult. Another method of detecting pests is to place tracking systems such as loose powder at the location(s) where it is suspected that the pests are located. However, this method allows the spread of loose powder that may be environmentally unfriendly and that may give a dirty or unsanitary appearance. This method is also not very useful for detection of pests located in remote areas unless the person can somehow observe the tracking devices from the opposite side of the structure. Still another method currently being used to detect the presence of pests is by electronic sensors. While the electronic sensors are both sophisticated and effective, the sensors are typically complex, expensive, and require power and maintenance by experts in the field.

BRIEF SUMMARY OF THE INVENTION

A wall-mountable system of the present invention detects and suppresses pests. The system includes a housing, a pest detection device, and a line. The housing is mounted to a wall and penetrates into a remote area behind the wall. The housing also has an access hole. The pest detection device is positioned behind the wall. The line is connected to the housing at a first end and is connected to the pest detection device at a second end.

DETAILED DESCRIPTION

Figure 1:
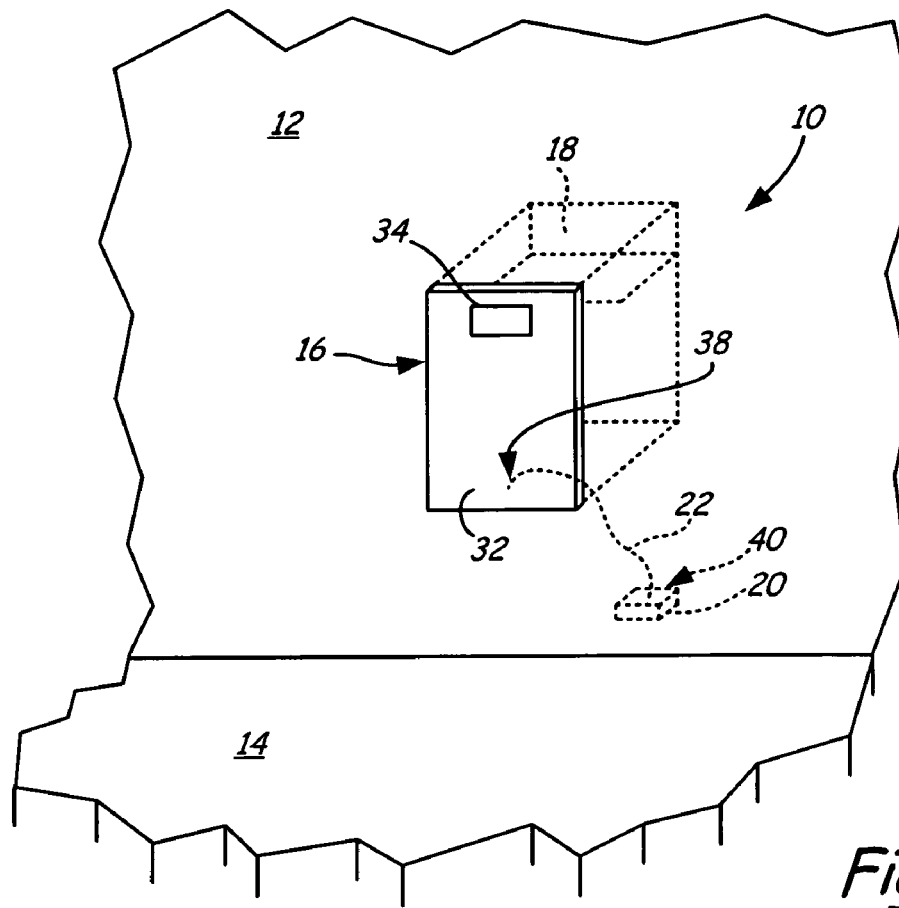
FIG. 1 is a front view of a first embodiment of a pest detection and suppression system.
Figure 2:
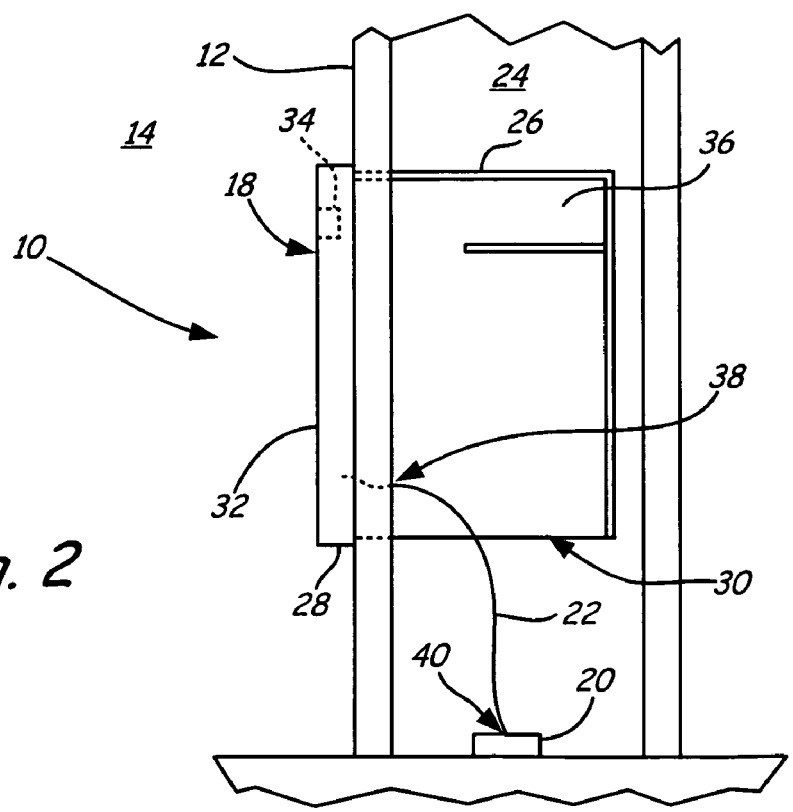
FIG. 2 is a side view of the first embodiment of the pest detection and suppression system.

FIGS. 1 and 2 show a front view and a side view, respectively, of a pest detection and suppression system 10 and will be discussed in conjunction with one another. Detection system 10 is a pest detection and suppression system that permits the detection of pests in remote locations, such as behind wall 12 of room 14. Detection system 10 is positioned within hole 16 of wall 12 and generally includes housing 18, pest detection device 20, and line 22 and is beneficial for detecting and suppressing pests in areas that are typically difficult to access.

Housing 18 is mountable to wall 12 and is positioned within hole 16 to provide access to remote area 24. Housing 18 is a hollow structure to allow an arm or the like to access remote area 24 and has a top surface 26, a bottom surface 28, and an aperture 30 located at bottom surface 28. Housing generally includes cover 32, locking mechanism 34, and cavity 36, and is positioned within hole 16 such that cover 32 of housing 18 faces room 14. When housing 18 is positioned in hole 16, aperture 30 located at a bottom surface 28 of housing 18 is placed past wall 12 and allows access to remote area 24. While housing 18 is depicted in FIGS. 1 and 2 as having a rectangular shape, housing 18 can be any shape as long as housing 18 is large enough to place and remove pest detection device 20 to and from remote area 24.

Cover 32 is pivotally attached to housing 18 and provides an access area between room 14 and remote area 24. When cover 32 is open, a person located in room 14 has access to remote area 24 behind wall 12 through housing 18. When cover 32 is closed, housing 18, and thus remote area 24, is not accessible from room 14. Cover 32 thus provides a means for accessing remote area 24 by a person located in room 14, but does not allow access to room 14 from remote area 24 by a pest located behind wall 12.

Locking mechanism 34 is located on cover 32 and maintains cover 32 in the closed position. Remote area 24 can be accessed by unlocking locking mechanism 28 and opening cover 32. Locking mechanism 34 is switchable between a locked and an unlocked position and ensures that remote area 24 is accessible through cover 32 only by appropriate persons. It may be desirable to limit access to remote area 24 for safety reasons. When bait or poison is used to detect or suppress pests, cover 32 must be secured to prevent unsuspecting persons from accidentally coming into contact with the bait or poison. Locking mechanism 24 may be any of a variety of mechanisms that permit limited access to a specified area, including, but not limited to: a lock and key, a screw and screwdriver, or any other mechanisms known in the art.

Cavity 36 provides a storage area for storing and maintaining documents related to detection system 10. When used in a commercial setting, it is useful for maintenance persons to be able to track the dates of service as well as identify pest detection device 20 being used. Cavity 36 is located proximate top surface 26 of housing 18 and provides a location for storing documents related to detection system 10 so that a person opening cover 32 will have immediate access to pertinent information regarding detection system 10. Although FIGS. 1 and 2 show cavity 36 as being located proximate top surface 26 of housing 18, cavity 36 can be located anywhere within housing 18.

Pest detection device 20 can be any device known in the art for detecting the presence of pests. Pest detection device 20 is placed in remote area 24 behind wall 12 and is used to detect and/or suppress the presence of pests. For example, pest detection device 20 may include, but is not limited to: baits, poison, traps, or any combination thereof. Because pest detection device 20 is positioned behind wall 12, it is not easily retrievable by a person located in room 14. Pest detection device 20 is thus connected to housing 18 by some retrieval means, such as by line or tether 22. In one embodiment, pest detection device 20 can be a sensor that detects pest activity in remote area 24. When the sensor detects pest activity, the sensor sends a signal to alert personnel of the presence of pests. The signal can be a visual signal, such as a light emitting diode, or an auditory signal as long as it is directed to obtain the attention of a person located outside remote area 24, such as in room 14 or a central control room.

Line or tether 22 has a first end 38 and a second end 40. First end 38 of line 22 is connected to housing 18 and second end 40 of line 22 is connected to pest detection device 20. Line 22 may be any retrieval means that is connectable to housing 18 at one end and connectable to pest detection device 20 at another end. The retrieval means should also be durable and impenetrable to breakage due to chewing by pests. For example, line 22 may include, but is not limited to: a chain, wire, or cable.

In operation, upon evidence or suspicion of pest activity in remote area 24, detection system 10 is positioned in hole 16 of wall 12. Hole 16 may be purposefully formed in wall 12 to provide access to remote area 24 behind wall 12, or may already exist by some other means. Cover 32 is opened by locking mechanism 34 such that remote area 24 can be accessed by a person located in room 14 through housing 18. Pest detection device 20 is attached to line 22 and is dropped from housing 18 onto the floor of remote area 24. Prior to closing and locking cover 34, documents related to detection system 10, such as the date of service, or the type of pest detection device 20 that is attached to line 22, are noted and placed in cavity 36 of housing 18. After a period of time, cover 32 is opened and pest detection device 20 is retrieved by line 22. Upon inspection of pest detection device 20, a person in room 14 will be able to determine whether pests are present in remote area 24. The person can also check the last date of service by reading the documents located in cavity 36. By reading the documents, the person can also determine whether pest detection device 20 was used to only detect the presence of pests, such as by using a non-lethal bait, or whether pest detection device 20 was also used to suppress the presence of pests, such as by using a poison or a pest trap.

Detection system 10 can be reused nearly indefinitely as long as a pest detection device is attached to line 22. Once pest detection device 20 has been exhausted, a new pest detection device 20 can be attached to line 22. If the pest activity has ceased, detection system 10 can also be removed from hole 16, and hole 16 can be covered by a more aesthetically pleasing panel.

Figure 3:
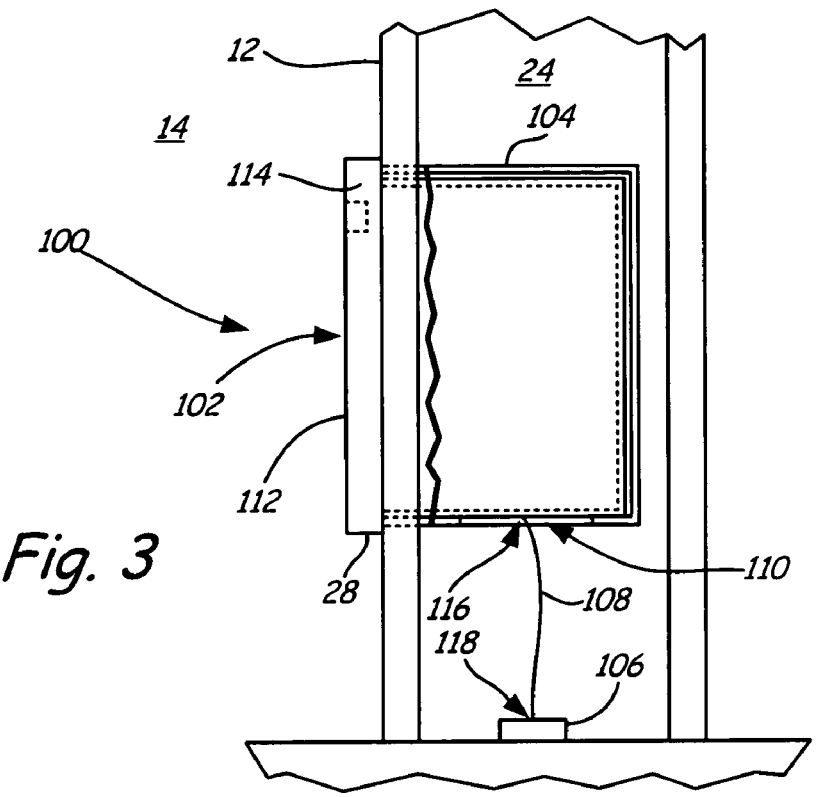
FIG. 3 is a side view of a second embodiment of a pest detection and suppression system.

FIG. 3 is a side view of a second embodiment of pest detection and suppression system 100. Detection system 100 generally includes housing 102, insert 104, pest detection device 106, and line 108. Housing 102 has an aperture 110 and includes cover 112 and locking mechanism 114. As with detection system 10, line 108 also has a first end 116 and a second end 118. Housing 102, pest detection device 106, and line 108 of second embodiment of detection system 100 function and interact in the same manner as housing 18, pest detection device 20, and line 22 of first embodiment of detection system 10. The primary difference between detection systems 10 and 100 of first and second embodiments, respectively, is insert 104 of second embodiment of detection systems 100.

Figure 4:
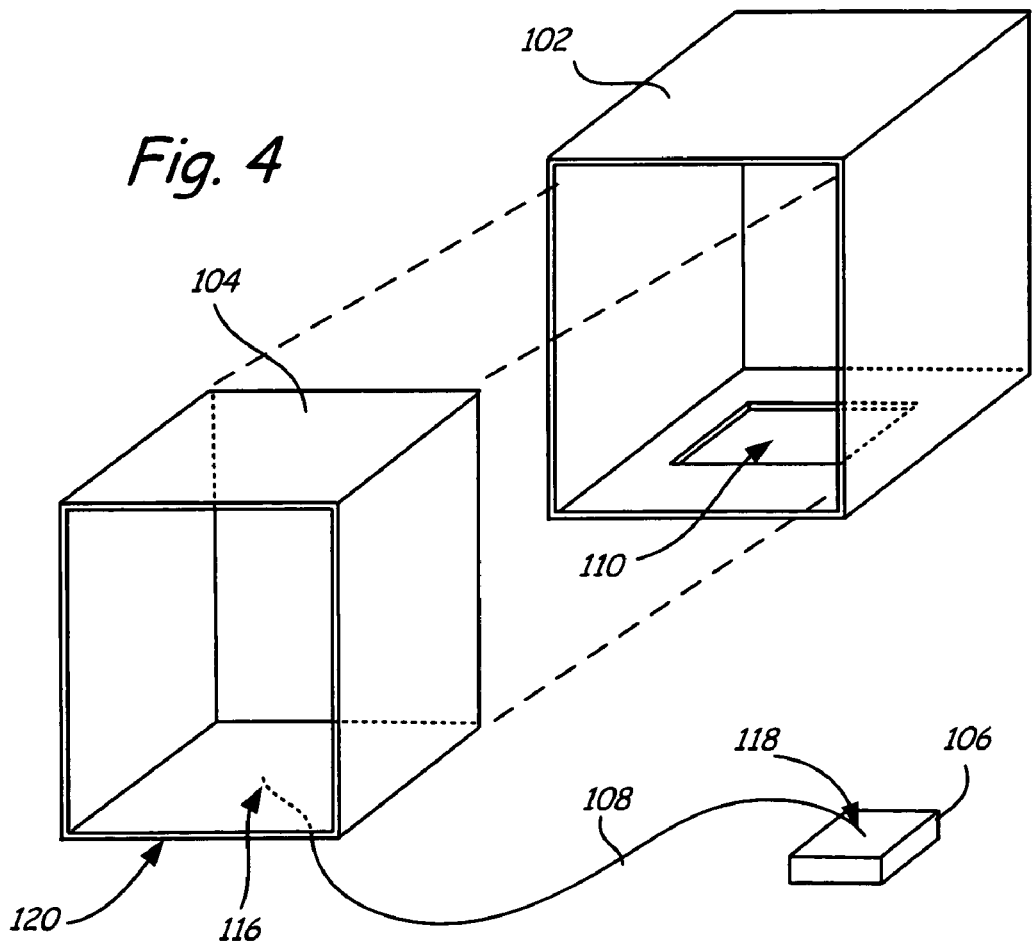
FIG. 4 is an exploded view of the second embodiment of the pest detection and suppression system.

FIG. 4 shows an exploded view of housing 102 and insert 104 and will be discussed in conjunction with FIG. 3. Insert 104 is sized slightly smaller than housing 102 in all dimensions and is designed to slide in and out of housing 102. Insert 104 may be hollow to allow for storage of documents related to detection system 100. Second embodiment of detection system 100 therefore does not need a cavity in housing 102 to store pertinent documentation. An additional benefit of insert 104 is that it prevents a pest from positioning itself in housing 102 and surprising a person checking detection system 100 when cover 112 is opened. Because insert 104 sits over aperture 110 of housing 102, a pest cannot climb into housing 102 and surprise a person checking on detection system 100, the pest will be limited to remote area 24. First end 116 of line 108 is connected to a bottom surface 120 of insert 104 and second end 118 of line 108 is connected to pest detection device 106.

In use, pest detection device 106 is first connected to insert 104 by line 108 and is dropped through aperture 110 of housing 102. Pest detection device 106 thus sits on the floor of remote area 24 and is easily accessible to pests in remote area 24. Insert 104 is then positioned fully in housing 102 and covers aperture 110 of housing 102. Cover 112 is then closed and locked by locking mechanism 114. When a person wishes to check for the presence of pests using detection system 100, cover 112 of housing 102 is opened by unlocking locking mechanism 114 and insert 104 is removed from housing 102. Line 108 is then pulled up through aperture 110 of housing 102 to examine pest detection device 106. Once pest detection device 106 has been examined, pest detection device 106 can be placed back in remote area 24 for reuse.

To reuse detection system 100, pest detection device 106 is placed back through aperture 110 of housing 102 to remote area 24. Insert 104 is then fully slid back within housing 102. If desired, the person can check the documentation of detection system 100 located within insert 104 and note the most recent service check and/or identify pest detection device 106. Once the documentation has been checked and the person has the information they need, cover 112 is closed and locked by locking mechanism 116. As with the first embodiment of detection system 10, second embodiment of detection system 100 can be reused as long as pest detection device 106 is replaced when exhausted.

The pest detection and suppression system of the present invention allows penetration of remote areas typically difficult to access from within an enclosed room. The detection system includes a hollow housing, a line, and a pest detection device. The housing is positionable within a hole in a wall behind which is a remote area with suspected pest activity. The pest detection device is connected to the housing by the line. The housing also includes a cover having a locking mechanism that controls access to the remote area through the housing. The pest detection device is placed in the remote area and is retrievable by a person located in the enclosed room through an aperture located at a bottom surface of housing by the line. The person can thus open the cover and retrieve the pest detection device for examination. The housing also includes a cavity that allows for the storage of documents related to the detection system, such as dates of service or the type of pest detection device being used.

In another embodiment of the pest detection and suppression system of the present invention, the detection system also includes an insert that is positionable within the housing. In this embodiment, the line connects the pest detection device to the insert. To position the pest detection device in the remote area, the pest detection device is placed through the aperture in the bottom surface of the housing before the insert is positioned in the housing. The insert covers the aperture and ensures that a pest cannot position itself in the housing. The insert is also hollow to allow for storage of documents related to the detection system.

Although the present invention has been described with reference to preferred embodiments, workers skilled in the art will recognize that changes may be made in form and detail without departing from the spirit and scope of the invention.

The invention claimed is:

1. A wall-mountable system for detecting and suppressing pests, the system comprising:
   (a) a housing mounted to a wall and penetrating into a remote area behind the wall, the housing having an access hole;
   (b) a pest detection device positioned behind the wall; and
   (c) a line having a first end and a second end, the first end connected to the housing and the second end connected to the pest detection device,
   wherein the access hole allows placement of the pest detection device outside of the housing in the remote area behind the wall.

2. The wall-mountable system of claim 1, and further comprising a pest suppression device attachable to the line.

3. The wall-mountable system of claim 1, wherein the housing comprises a cavity for housing documentation.

4. The wall-mountable system of claim 1, wherein the line allows retrieval of the pest detection device.

5. The wall-mountable system of claim 1, wherein the housing is secured by a locking mechanism.

6. The wall-mountable system of claim 1, and further comprising an insert slidably engageable with the housing.

7. The wall-mountable system of claim 1, wherein the pest detection device is a sensor, and wherein the sensor sends a signal upon activation of the pest detection device.

8. A system for detecting and suppressing pests located behind a structure, the system comprising:
   (a) a pest detection device positioned behind the structure;
   (b) a housing mounted to the structure for providing access to the pest detection device so that the pest detection device can be inserted to and retrieved from a position behind the structure through the housing, wherein the position is outside of the housing; and
   (c) means for retrieving the pest-detection device.

9. The system of claim 8, wherein the means for retrieving the pest detection device is a line connected to the pest detection device and the housing.

10. The system of claim 9, wherein the line is a cable, a wire, or a chain.

11. The system of claim 8, wherein the pest detection device is a sensor and wherein the sensor sends a signal upon detection of pest activity.

12. The system of claim 8, wherein the housing comprises a cavity for maintaining records related to detecting and suppressing pests.

13. The system of claim 12, wherein the cavity is an insert slidably engagable with the housing.

14. The system of claim 8, wherein the pest detection device also functions as a pest suppression device.

15. A method of detecting pest activity, the method comprising:
   (a) mounting a housing to a structure;
   (b) inserting a pest detection device through the housing into a void of the structure that is outside of the housing;
   (c) connecting the pest detection device to the housing; and
   (d) inspecting the pest detection device for pest activity.

16. The method of claim 15, wherein connecting the pest detection device to the house comprises using a line.

17. The method of claim 15, wherein checking the pest detection device for pest activity comprises monitoring a sensor attached to the pest detection device.

18. The method of claim 15, wherein checking the pest detection device for pest activity comprises retrieving the pest detection device from the void of the structure.

19. The method of claim 15, and further comprising maintaining records related to the detection of pest activity.

* * * * *